US005297325A

United States Patent [19]

Thelen

[11] Patent Number: 5,297,325

[45] Date of Patent: Mar. 29, 1994

[54] HYDRAULIC TOOL

[75] Inventor: William G. Thelen, Onondaga, Mich.

[73] Assignee: Aeroquip Corporation, Maumee, Ohio

[21] Appl. No.: 29,828

[22] Filed: Mar. 11, 1993

[51] Int. Cl.[5] .......... B23P 19/04

[52] U.S. Cl. .......... 29/237; 29/252; 29/282

[58] Field of Search .......... 29/237, 252, 283.5, 29/432, 525, 282; 285/382, 382.1-382.7, 39

[56] References Cited

U.S. PATENT DOCUMENTS

| | | | |
|---|---|---|---|
| 1,018,035 | 2/1912 | Leeuw | 269/32 |
| 2,623,080 | 12/1952 | Young | 269/32 |
| 2,695,539 | 11/1954 | Grueninger | 269/25 |
| 3,700,227 | 10/1972 | Sessody | 269/32 |
| 4,189,817 | 2/1980 | Moebius | 29/237 |
| 4,257,135 | 3/1981 | Moebius . | |

FOREIGN PATENT DOCUMENTS 3039818 5/1982 Fed. Rep. of Germany .......... 269/25

OTHER PUBLICATIONS

Brochure of Deutsch Metal Components, 14800 S. Figueroa Street, Gardena, Calif. 90248-1795, printed Aug., 1992.

*Primary Examiner*—Robert C. Watson

*Attorney, Agent, or Firm*—Emch, Schaffer, Schaub & Porcello

[57] ABSTRACT

A hydraulic tool having a piston movable along a first axis and a jaw member movable along a second axis spaced from and parallel to the first axis is provided with supporting means to resist angular deflection and is provided with a floating shaft abutting the piston to absorb any lateral deflection without causing deflection to the piston. The abutment face of the piston is outwardly convex.

32 Claims, 5 Drawing Sheets

HYDRAULIC TOOL

BACKGROUND ART

The present invention is directed to a hydraulic tool for pushing together opposing members which are laterally offset from the axis of the hydraulic cylinder. It is particularly useful for assembling tubular components to form a permanent tube joint of a type where a constrictor ring with a tapered bore is axially forced over a collar encircling the end of a tube to cause local annular compression of the collar and the encircled tube. Tube joints of this type are shown in a number of prior art patents including U.S. Pat. Nos. 3,827,727; 4,026,006 and 4,482,174. Tube joints of this type require significant amounts of axial force to cause the constrictor ring to be moved axially over the collar member while radially compressing and deforming it and the tube encircled by such collar.

U.S. Pat. No. 4,189,817 discloses a hydraulic assembly tool for tube fittings which may be used for assembling the components of the tube joints described in such patents. Although hydraulic assembly tools of the type described in U.S. Pat. No. 4,189,817 have the ability to assemble such components, the mechanical inefficiencies, primarily due to friction, associated with that design cause the prior art tools to be larger than necessary and to have limited service lives.

DISCLOSURE OF THE INVENTION

The present invention is directed to a hydraulic tool specifically tailored to assemble tube joints of the type described in the above-identified patents or other types of devices requiring axial movement toward one another under high pressures. In contrast to hydraulic assembly tools of the type described in U.S. Pat. No. 4,189,817, the tool of the present invention can, with the same size tool or the same diameter cylinder and piston, develop significantly higher loads at similar hydraulic pressures, for example, pressures on the order of 8000 psi to 10,000 psi. The reason for this ability to generate higher loads under similar conditions is due to reduced frictional loss in the hydraulic tool of the present invention as compared to frictional loss encountered in the above prior art hydraulic tool. In order to obtain hydraulic pressures of such magnitude, it is required to have very tight tolerances for the cylinder chamber of the hydraulic cylinder and for the piston axially movable therein. The tight tolerances are required for operation at such high pressures in order to prevent leakage of the fluid. As is true with the prior art hydraulic assembly tool described in U.S. Pat. No. 4,189,817, the hydraulic tool assembly of the present invention utilizes a fixed jaw and a movable jaw which are radially offset from the axis of the hydraulic cylinder and piston. As a result of the fact that the jaws are radially offset from the axis of the cylinder and piston, there is a tendency for the jaws and for the piston to be laterally or angularly deflected. Any lateral or angular deflection of the piston may lead to leakage of hydraulic fluid or in the case of a cylinder and piston manufactured to extremely tight tolerances, binding of the piston in the cylinder chamber. This binding can cause large frictional forces which must be overcome by the hydraulic pressure, and mechanical loads which must be supported by the cylinder and other components. The present invention does not have to overcome the forces, so it can use a smaller piston, and has reduced loads, so it can use smaller components. Additionally, the absence of large lateral loads on the piston means it need not be fabricated from a high strength material. For example, the hydraulic tool of the present invention may be formed of a bronze material with excellent frictional and wear characteristics. This further reduces the frictional forces.

The present invention utilizes unique means for overcoming the effects of lateral deflection of the piston rod as well as for resisting such lateral deflection upon movement of the cylinder and the moveable jaw under resistance of the members being compressed together. According to the present invention, a floating shaft is maintained in abutting but non-fixed relationship with the piston. The floating shaft is rigidly affixed to a slide member and, with such slide member, forms a carrier unit. The floating shaft may take a small degree of lateral deflection without transmitting angular force resulting from such deflection to the piston. Such abutting relationship between the shaft and the piston insures that the piston is always properly aligned along the axis of the cylinder chamber even though the jaws and the shaft extending from its abutting relationship with the piston may become laterally deflected as a result of the extreme pressures developed by the radially offset jaws moving toward one another. The piston has an outwardly convex abutment surface which causes the compressive abutment forces to be concentrated at or near the axis. As a result of the fact that the piston is not subject to being angularly or laterally deflected upon angular or lateral deflection of the shaft, the hydraulic tool of the present invention can more easily be adapted to operate at hydraulic pressures higher than 8000 psi to 10,000 psi which is the upper end of the normal operating pressure for the assembly tool shown in U.S. Pat. No. 4,189,817.

The hydraulic tool of the present invention also resists such lateral deflection by (1) utilization of an arm of the slide member having a self-lubricating face member maintained in sliding engagement with the cylinder housing and (2) a bushing rigidly affixed to the cylinder housing to slideably receive a journal affixed to the shaft.

The design of the tool of the present invention permits the carrier unit consisting of the slide member and shaft to be readily changed without requiring removable of the piston from the cylinder chamber.

The use of a large diameter compression spring, external to the hydraulic system, offers several advantages. Neither the spring nor its matching components need to have expensive provisions for attachment of the spring. The spring can be replaced without disturbing the hydraulic system. The piston and cylinder can be designed to minimize the volume of pressurized fluid and, thus, the losses associated with the compressibility of the fluid. The spring can be designed with lower stresses and higher performance than one which must fit within restricted spaces of the hydraulic system.

BEST MODE OF CARRYING OUT INVENTION

Figure 1:
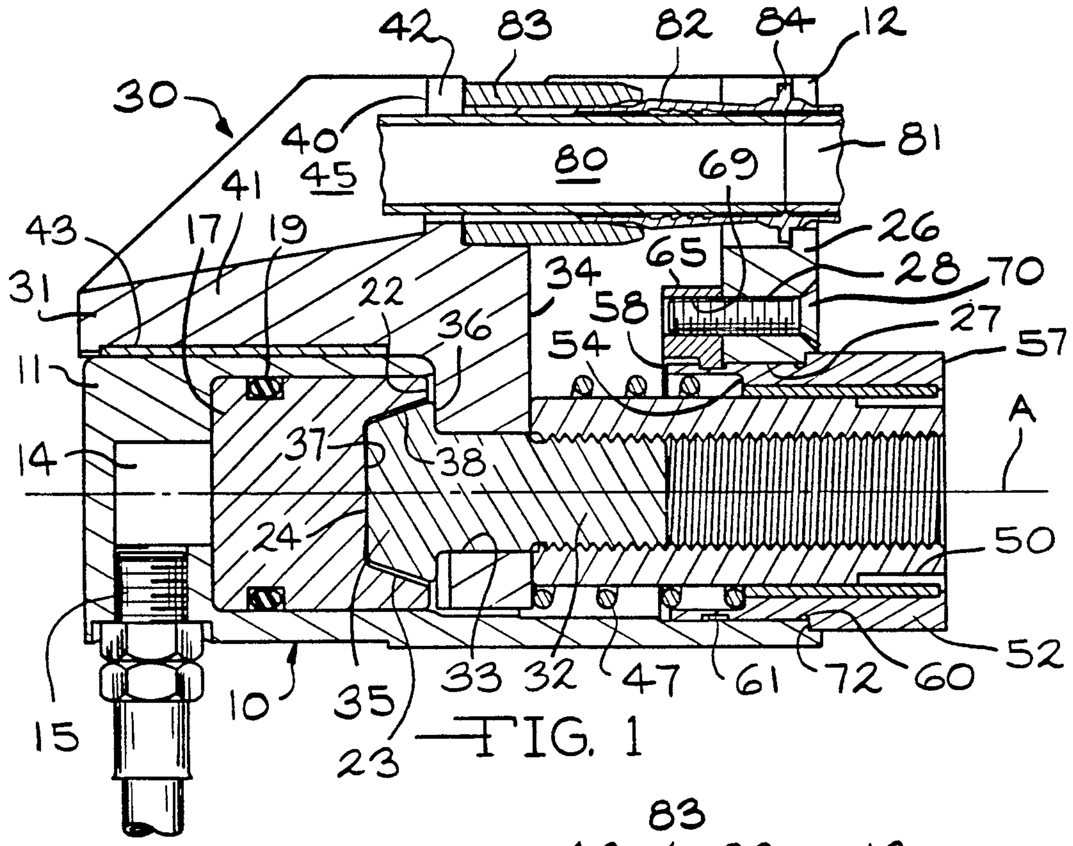
FIG. 1 is an elevational view, in section, of the hydraulic tool of the present invention with the jaws in an open position prepared to assemble a tube joint from the components positioned between the jaws.

Referring now to the drawings, there is provided a body structure 10, preferably formed in one piece, which includes a hydraulic cylinder 11 at one end and a fixed jaw 12 at the other end. The hydraulic cylinder includes a hydraulic fluid entrance chamber 14, a threaded inlet passageway 15 for introducing hydraulic fluid under pressure into said chamber 14 and an open ended cylindrical chamber 16 lying on a longitudinal axis A and communicating with the entrance chamber 14. A piston 17 is snugly received in the cylindrical chamber 16 for reciprocal axial movement between the retracted position shown in FIG. 1 and the extended position shown in FIG. 2. The piston is provided with an annular groove 18 in which a T-seal or an O-ring gasket 19 or other conventional piston seal is positioned to provide sealing engagement with the cylindrical wall of the cylindrical chamber 16. For example, a T-seal of the type marketed by Greene, Tweed & Co., Inc. Kulpsville, Pa. 19443-0305 may be used.

The piston 17 has a face 21 at its trailing end adjacent the entrance chamber 14. The face 21 may be planar or other shape matching the end of the chamber 16. The opposite or leading end 22 of the piston 17 has a pocket or concavity formed therein which is defined by an inwardly tapering wall 23 and an abutment surface 24. The inwardly tapering wall 23 may define a section of a cone which extends to and joins with the abutment surface 24. The abutment surface 24 is centrally positioned on axis A and has an outwardly convex shape. For example, the abutment surface 24 may be convexly curved with the portion centered on the axis A forming the leading portion of the abutment surface 24. If desired, for ease of manufacture, instead of being curved, the abutment surface 24 could be in the shape of a truncated cone having a flat surface at the center. As used in the present application, the term "convex" is intended to include a surface following a straight line path as well as a curved path.

The fixed jaw 12 is an integral part of and forms the upper portion of an upwardly extending arm 26 which forms the end of the body structure 10 opposite the hydraulic cylinder 11. The arm 26 includes a circular opening 27 centered on the axis A and a threaded aperture 28 between the circular opening 27 and the fixed jaw 12. A pair of parallel spaced apart upstanding walls 20 extend between the hydraulic cylinder 11 and the arm 26.

Positioned within the body structure 10 for axial movement relative thereto is a carrier unit 30 consisting of a slide member 31 and a shaft member 32 frictionally or otherwise rigidly engaged in an aperture 33 extending through a downwardly extending leg 34. When the carrier unit 30 is positioned in the body structure 10 as shown in FIG. 1, the aperture 33 and the shaft member 32 are centered on the axis A.

The shaft member 32 has an enlarged head 35 which includes an annular abutment 36 in contact with the downwardly extending leg 34, a substantially planar abutment 37 centered on the axis A and an inwardly tapering annular surface 38 joining the annular abutment 36 and the planar abutment 37. The inwardly tapering surface 38 is spaced from and, if desired, may be parallel to the inwardly tapering wall 23 of the piston 17. The end of the shaft member 32 opposite the head 35 extends beyond the leg 34 and has threads 39 formed thereon. The planar abutment 37 contacts the outwardly convex abutment surface 24 of the piston 17. If desired, the abutment 37 could be outwardly convex in which case, the abutment surface 24 of the piston 17 will preferably be flat.

The slide member 31 also includes an upwardly extending arm 40 and a slide arm 41 slidingly engaged to the upper side of the hydraulic cylinder 11. The upper end of the upwardly extending arm 40 has a pair of spaced apart legs which define a movable jaw 42. A pair of web members 45 extend upwardly from opposite edges of the arm 41 and are joined to the upwardly extending arm 40 and movable jaw 42 to provide additional support to such movable jaw 42. Each of the web members 45 is in slideable engagement with the inner surface of one of the walls 20. Thus, the walls 20 provide support from twisting to the slide member 31. The slide arm 41 has a recess 43 formed in its side adjacent the hydraulic cylinder 11 in which is adhered a self-lubricating plate 44. The self-lubricating plate is not in and itself new and may be formed of a suitable metal such as lead or brass impregnated with Teflon ®. Preferably, the plate 43 is spaced from the trailing end of the slide arm 41. The plate 43 may be retained in the recess 44 by a suitable epoxy.

Figure 2:
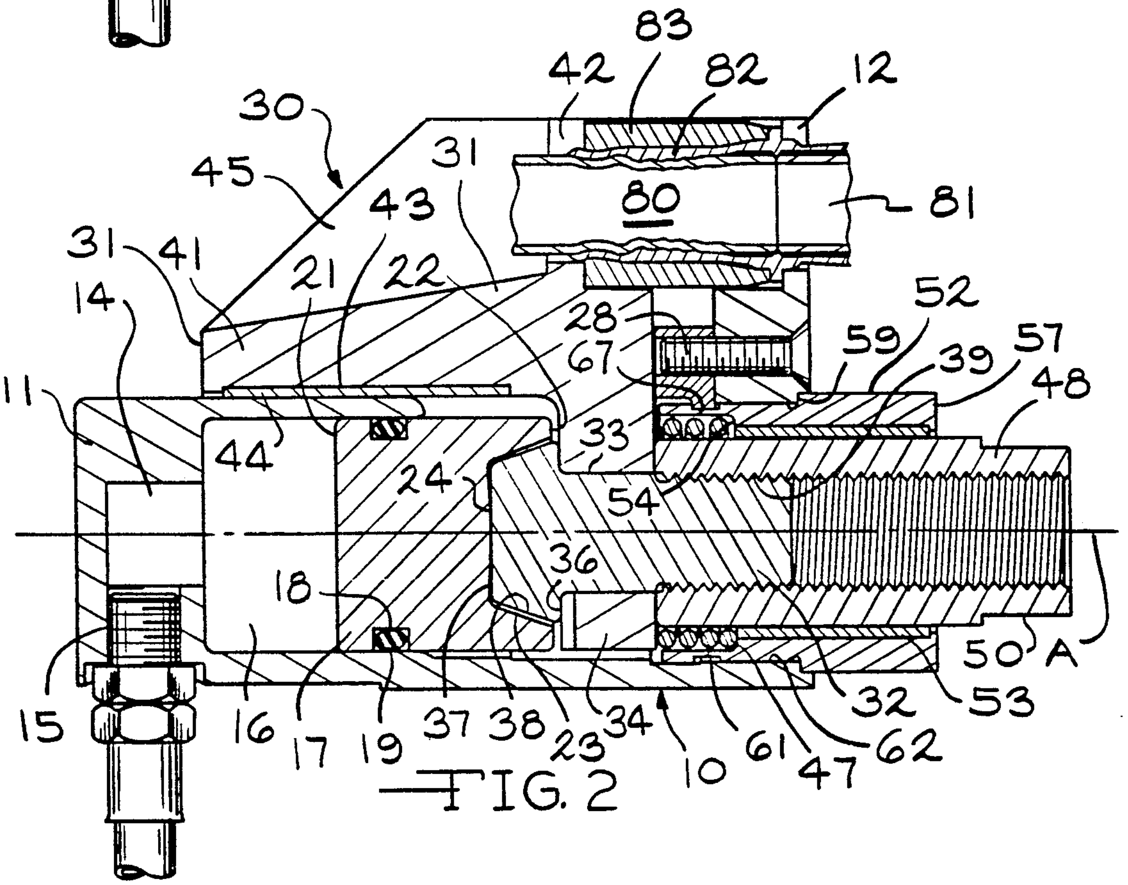
FIG. 2 is a view similar to FIG. 1 showing the position of the parts with the jaws moved toward a closed position.
Figure 3:
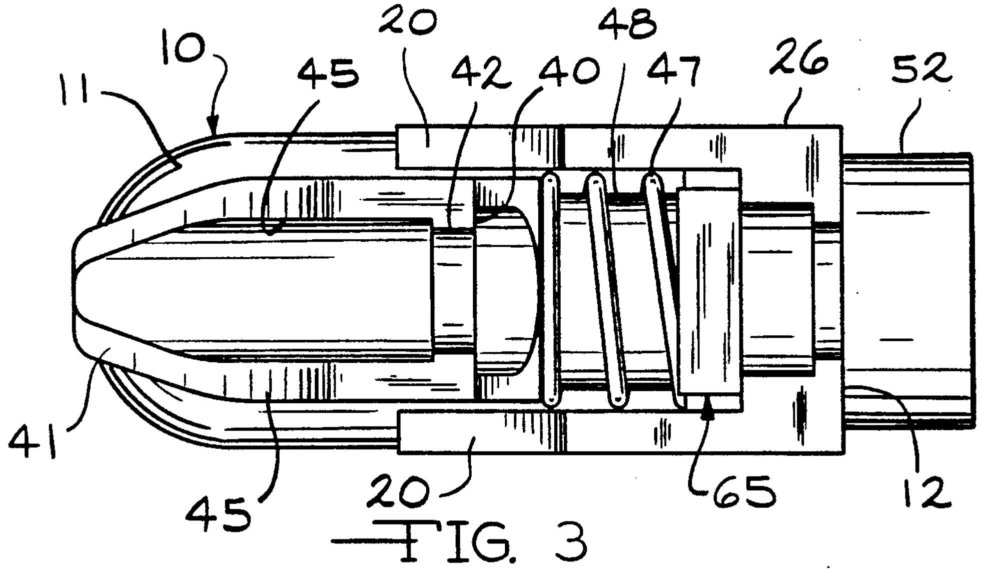
FIG. 3 is a top plan view of the hydraulic tool of the present invention.
Figure 4:
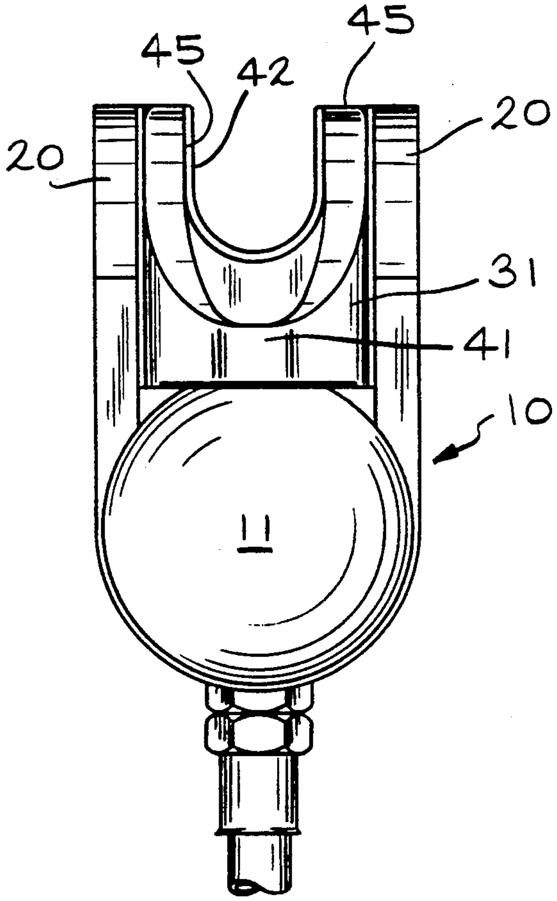
FIG. 4 is an end view taken from the left of FIG. 1.
Figure 5:
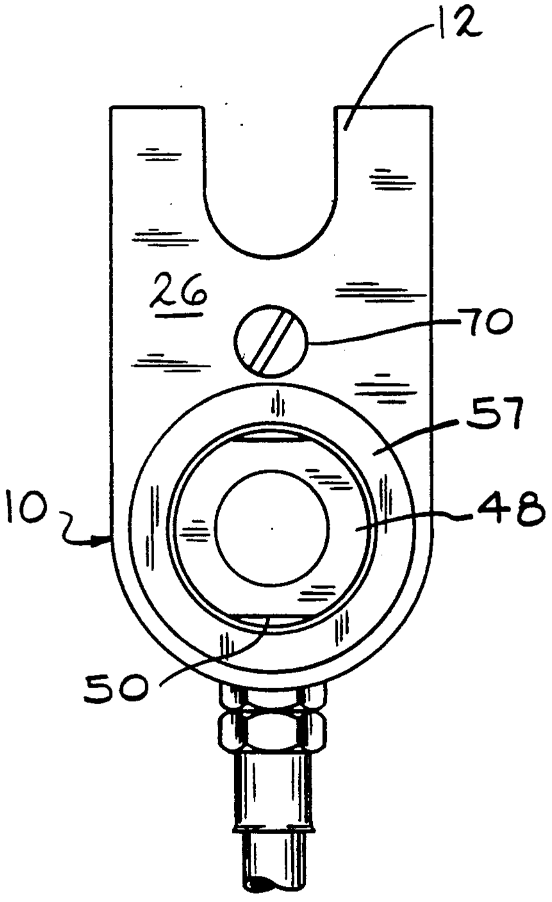
FIG. 5 is an end view taken from the right of FIG. 1.

As can be seen from FIGS. 1 and 2, introduction of hydraulic fluid under pressure into the chamber 14 moves the piston 17 and the abutting carrier unit 30 to the right as viewed in the figures thus causing the movable jaw 42 to approach the fixed jaw 12.

A compression spring 47 is provided to urge the carrier unit 30 and piston 17 back to the position shown in FIG. 1 upon release of hydraulic fluid from the chamber 16. The compression spring 47 encircles a journal 48 which is threadedly engaged to the threads 39 of the shaft member 32. The journal 48 is provided with a cylindrical exterior surface 49. If desired, the journal may have a pair of parallel wrench flats 50 for use in tightly engaging the threaded journal 48 to the threads 39 of shaft member 32.

The journal 48 is slidingly received in a bushing 52 having an annular self-lubricating member 53 adhered therein. The bushing 52 is internally recessed to form a shoulder 54 against which the compression spring 47 abuts. Thus, as may be seen particularly in FIGS. 1 and 2, the compression spring 47 encircling the threaded journal 48 urges the carrier unit 30 and piston 17 to their retracted positions shown in FIG. 1 when there is no or little hydraulic pressure in the hydraulic cylinder 11. The spring 47 has its end portions captured, respectively, between the shoulder 54 of bushing 52 and the leading side of the downwardly extending leg 34 of the slide member 31. Upon introduction of hydraulic fluid into the cylindrical chamber 16, the piston 17 is moved to the right moving with it the carrier unit 30 including the downwardly extending leg 34 which compresses the compression spring 47 against the abutment 54 of bushing 52 as shown in FIG. 2.

The exterior of the bushing 52 has a cylindrical configuration of predetermined diameter at the end 57 furtherest removed from the hydraulic cylinder 11. The bushing 52 extends axially from the end 57 and terminates in a second end 58. Approximately midway between the ends 57 and 58, the exterior of the bushing 52 is recessed to form an external shoulder 59 with a first annular groove or undercut 60 being formed adjacent such shoulder. Another annular, rectangular-shaped groove 61 is formed in the bushing exterior between the groove 60 and the second end 58. The exterior wall portion 62 between the groove 60 and rectangular groove 61 is cylindrical and has a diameter smaller than the diameter of the exterior surface adjacent the end 57.

Figure 7:
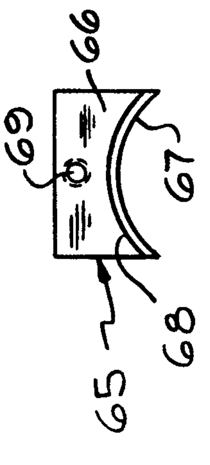
FIG. 7 is an end view of the clip element.
Figure 6:
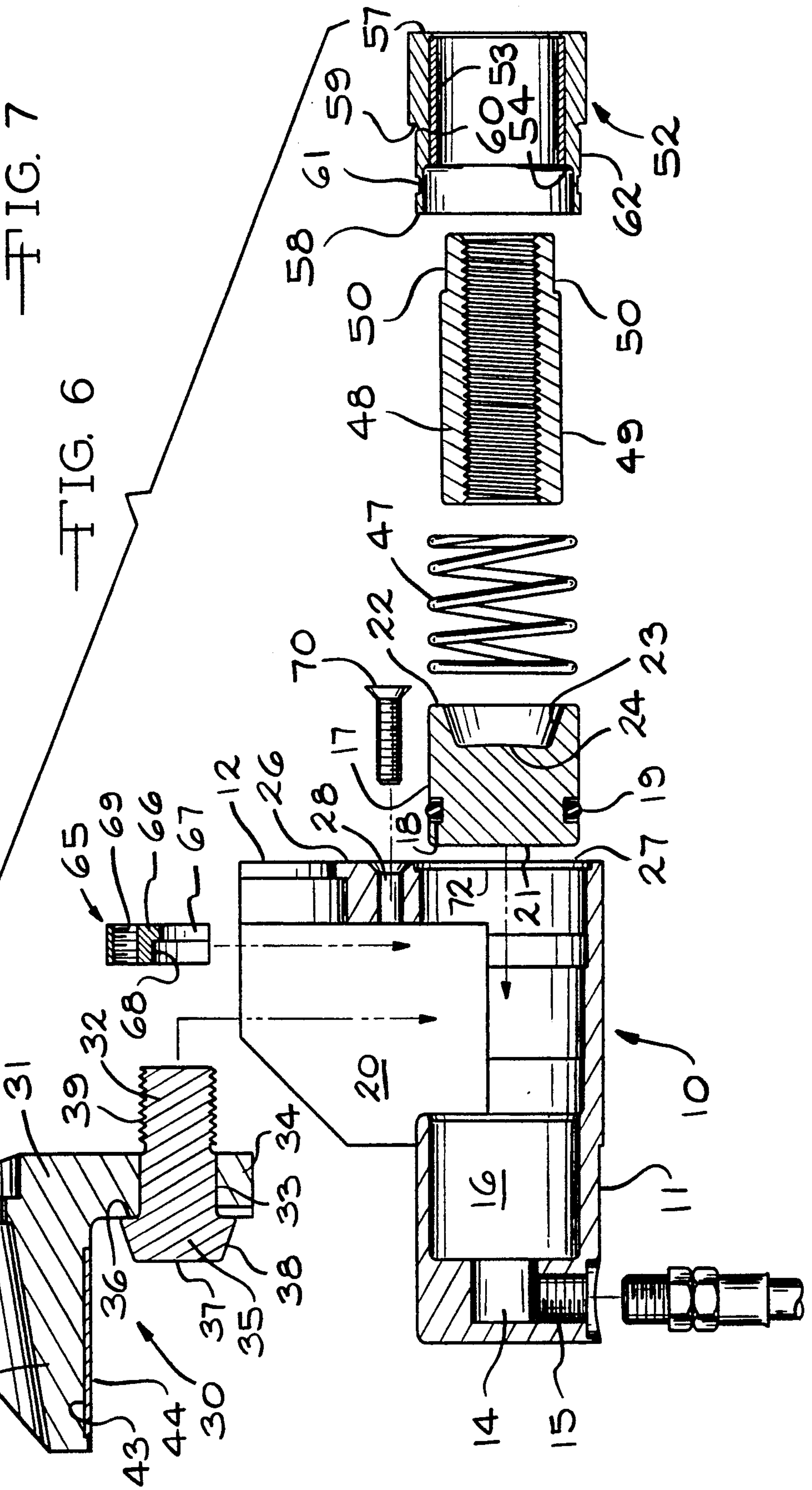
FIG. 6 is an exploded view of the hydraulic tool of the present invention.
Figure 8:
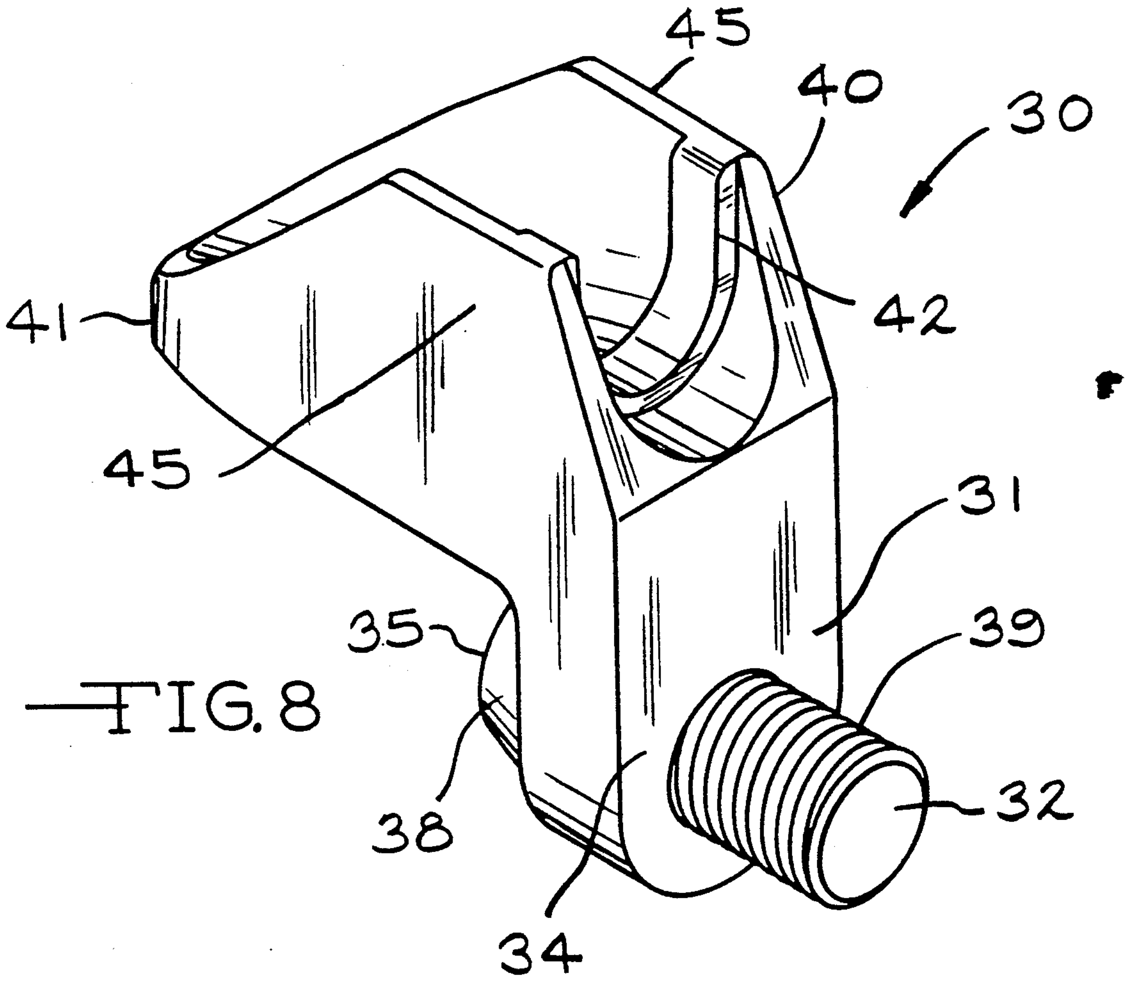
FIG. 8 is a perspective view of the carrier unit.

The bushing 52 is retained on the body structure 10 by means of a clip 65. The clip 65 has a body portion 66 with a downwardly extending leg 67 having a cross-sectional size permitting it to fit within the rectangular groove 61 of the bushing. As viewed in end view, (see FIG. 7) the leg 67 is curved following a radius of curvature similar to the radius of curvature of the rectangular groove 61 of bushing 52 so that, when assembled, the lower edge of the leg 67 contacts the exterior surface of the rectangular groove 61. Preferably, the other lower portions 68 of the body portion 66 are also curved but on a slightly larger radius in order to be spaced from the opposing exterior surface of the bushing 52 adjacent the second end 58. The clip 65 is provided with a threaded aperture 69 which, when assembled, is aligned with the threaded aperture 28 of the body structure 10. When so positioned a screw 70 may be affixed to retain the clip 65 on the body structure 10.

The end of the body structure 10 opposite the hydraulic cylinder 11 is recessed to form a shoulder 72 which assists in maintaining proper alignment of the bushing 52 with respect to axis A and with respect to the depth of its insertion in the body structure 10 so that the rectangular groove 61 will be aligned to receive the leg 67 of the clip 65.

FIGS. 1 and 2 show the operation of the hydraulic tool of the present invention to assemble the components of a tube joint. There is shown positioned between the fixed jaw 12 and the movable jaw 42 the components used in forming a tube joint. The components may include a first length of tubing 80, a second length of tubing 81, a collar 82 and a lock ring 83. The tubes 80 and 81 have cylindrical exterior surfaces prior to being deformed in the process of forming the joint. The collar 82 has an irregular exterior surface and an interior surface sufficiently large to permit its being slipped over the ends of the respective lengths of tubing 80 and 81. The lock ring 83 may have a tapered interior surface such that its leading end may be readily slipped over the end of the collar 82 but may not be completely moved to encircle the collar 82 except upon radial deformation of the collar as described in the prior art patents referenced in the Background Art section of the present application. The collar 82 may have a flange 84 extending radially outwardly. When the collar 82 is positioned with the flange 84 abutting the fixed jaw 12 and the end of the lock ring 83 abutting the movable jaw 42, the tube lengths 80 and 81 will extend along an axis parallel to the axis A. Hydraulic fluid is then introduced into the entrance chamber 14 and cylindrical chamber 16 causing the piston 17 and the carrier unit 30 including the movable jaw 42 to move towards the fixed jaw 12 thereby forcing the lock ring 83 over the collar 82 thus radially deforming the collar 82 and the underlying tube length 80 thus causing the collar 82 to become permanently engaged thereto. The tendency of the movable jaw 42 and the shaft member 32 to become laterally deflected as a result of the load placed on the movable jaw 42 and the fixed jaw 12 along an axis which is radially spaced from the axis A of movement of the piston 17 is resisted by the unitary construction of the upstanding arm 26 and fixed jaw 12 with the cylinder 11 and, to a lesser extent, (1) by the bushing 52 firmly retained in the body structure 10 and supporting the threaded journal 48 in sliding relationship and (2) by the slide arm 41 slideably riding against outer surface of the cylinder 11. However, despite the resistance to lateral deflection afforded by such construction, there will still be a minute, but measureable, angular or lateral deflection of the shaft member 32 and journal 48. However, by virtue of the fact that the shaft member 32 with its enlarged head simply abuts the convexly curved abutment surface 24 of the piston 17 and is not joined or secured to the piston, such angular or lateral deflection of the shaft member 32 does not cause any deflection or jamming of the piston 17 in the cylindrical chamber 16. Furthermore, by providing a convex curvature to the abutment surface 24 it is assured that the axial forces generated upon movement of the piston 17 will be concentrated near the axis A. In contrast, if the abutment surface 24 and the abutment 37 were both planar, any lateral deflection of the shaft member 32, would have a tendency to move the point of maximum force concentration away from the axis A and toward the outer portion of the planar abutment 37 in an area of such planar abutment closer to the movable jaw 42.

At such time as the carrier unit 30 consisting of the slide member 31 and shaft member 32 becomes worn or damaged, the carrier unit 30 may be readily replaced in the body structure 10 without the necessity of removing the piston 17 from the cylinder thus avoiding the potential for contamination of the hydraulic fluid.

A comparison of the hydraulic tool of the present invention with the hydraulic tool shown in U.S. Pat. No. 4,189,817, which is assigned to the assignee of the present invention, showed that frictional losses for the hydraulic tool of the present invention were significantly less than the frictional losses of the prior art tool. As a result, there was significantly lower rates of wear on the piston 17 and cylindrical chamber 16, the plate 44 and adjacent surface of the housing 10, and the journal 48 and the annular self-lubricating member 53 of the bushing 52. As will be appreciated such reduced rates of wear provide greater service life to the tool.

Figure 9:
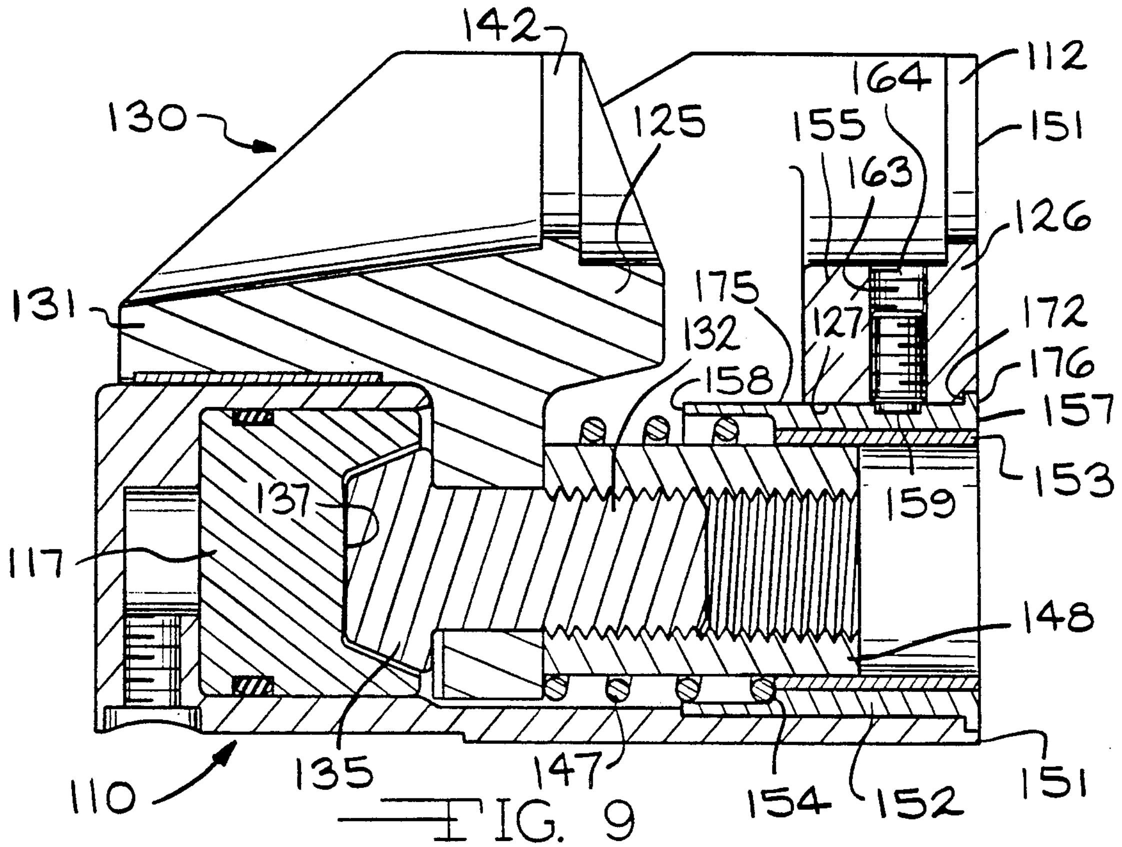
FIG. 9 is a view similar to FIG. 1 showing a modified embodiment.
Figure 10:
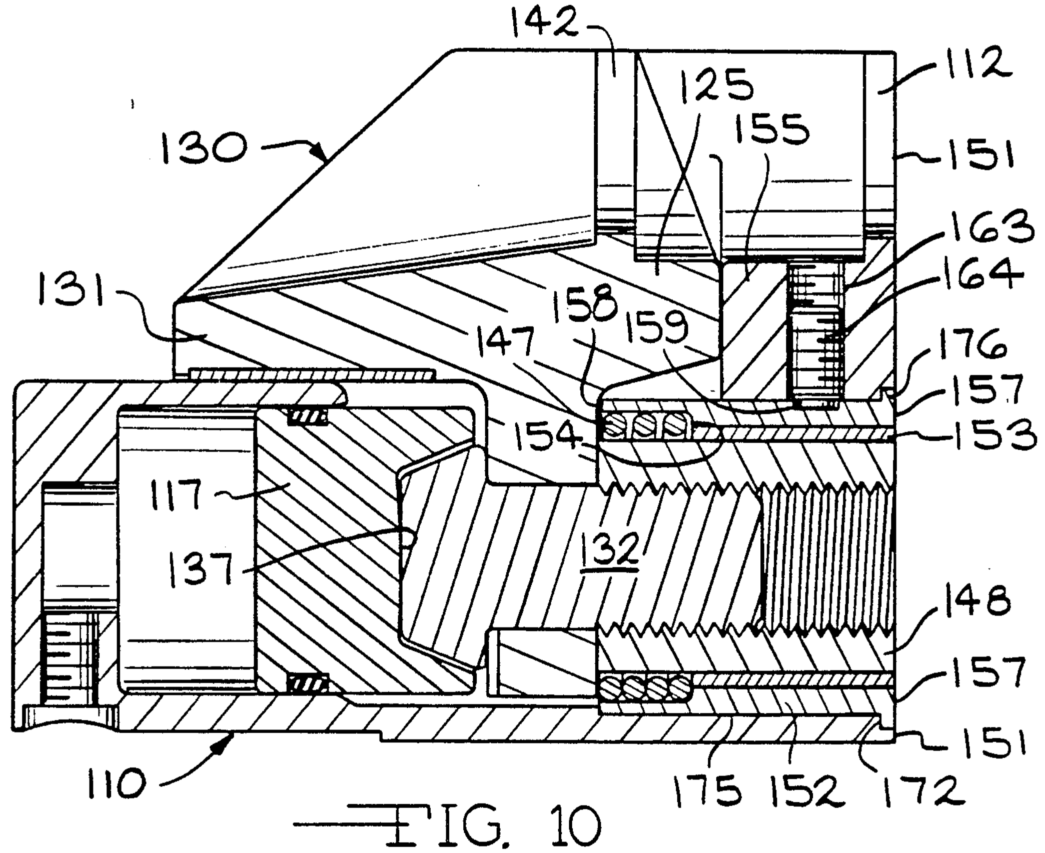
FIG. 10 is a view similar to FIG. 9 showing the position of the parts with the jaws moved to a closed position.

Referring now to FIGS. 9 and 10, there is shown a modified embodiment of the present invention. The embodiment of FIGS. 9 and 10 is particularly well suited for use in small, cramped areas. The hydraulic tool of the embodiment of FIGS. 9 and 10 includes a body structure 110 similar to the body structure 10 of the embodiments shown in FIGS. 1–8. A carrier unit 130, identical to the carrier unit 30 of the embodiment previously described is positioned within the body structure 110. As such, the carrier unit includes a slide member 131 and a shaft 132 permanently affixed thereto. The shaft 132 has an enlarged head 135 with a planar abutment 137 at one end and threads 139 at the other end. A threaded journal 148 is threadedly engaged to the shaft member 132. As will be readily apparent, the threaded journal 148 is significantly shorter than the threaded journal 48 of the embodiment of FIGS. 1-8. As can be seen in FIG. 10, the design of this embodiment is such that the threaded journal 148 does not extend beyond the end 151 of the body structure 110 when the piston 117 and the slide member 131, including the shaft 132 and journal 148 carried thereby, are in the extended position shown in FIG. 10. This may be contrasted with FIG. 2 of the previous embodiment in which the threaded journal 48 extends beyond the body structure 10 when the hydraulic cylinder 17 is in the extended position shown in FIG. 2.

Under the embodiment shown in FIGS. 9 and 10, there is provided a bushing 152 having an annular self-lubricating member 153 positioned therein. The bushing 152 extends from a first or right end 157 which is flush with the right end 151 of the body structure 110 as viewed in FIGS. 9 and 10 to a second end 158. The bushing 152 is internally recessed at the second end 158 to define a shoulder 154. The recessed area of the bushing 152 between the second end 158 and the shoulder 154 cooperates with the external surface of the threaded journal 148 to form a recess in which the end portion of the compression spring 147 is positioned, with the right end of the compression spring 147 bearing against the shoulder 154. The opposite or left end of the compression spring 147 bears against the right side of the slide member 131.

The body structure 110 is provided with a shoulder 172. The bushing 152 has a cylindrical exterior surface 175 and a radially outwardly extend flange 176 at its right end 157 which is sized to engage the shoulder 172 of the body structure 110 so that when assembled therein the right end 157 of the bushing 152 is flush with the right end 151 of the body structure 110. A recess 159 is formed in the exterior surface of the bushing 152.

As in the previous embodiment, the body structure 110 is provided with an upstanding arm 126 terminating at its outer end in a fixed jaw 112. The arm 126 is provided with a shoulder 155. The arm is provided with a cylindrical opening 127 which extends through the shoulder 155. The bushing 152 is received within the cylindrical opening 127.

A threaded passageway 163 is formed in the shoulder 155 and, when assembled, the recess 159 of the bushing 152 is aligned with such threaded passageway 163. A socket set screw 164 is received in the threaded passageway 163 and engages the recess 159 of the bushing 152 to retain the bushing in the body structure 110.

Preferably, the slide member 131 will be provided with a shoulder 125 positioned to abut the shoulder 155 of the arm 126 when the piston 117 is moved to its extended position. Such abutting members thus acting as a stop to limit the extension of such piston 117.

Tests have been conducted using a hydraulic tool of the type disclosed herein and a similar size hydraulic tool of the type shown in U.S. Pat. No. 4,189,817. Such tests have shown that the tool of the present invention has greater force output than a comparable size tool of the type described in U.S. Pat. No. 4,189,817 with significantly lower frictional losses.

Many modifications will become readily apparent to those skilled in the art. Accordingly, the scope of the present invention should be limited only by the scope of the claims appended hereto.

I claim:

1. A hydraulic tool comprising:

(a) a body structure including a hydraulic cylinder extending along a first axis and a stationary tool element offset from said first axis, (b) a piston received in said cylinder for movement along said first axis from a retracted to an extended position upon introduction of hydraulic fluid into said cylinder, said piston including an abutment face centered on said first axis;

(c) a slide member having a leg extending radially with respect to said first axis, said leg having a portion lying on said first axis and a movable tool element offset from said first axis, said movable tool element cooperating with said stationary tool element to define a second axis offset from and parallel to said first axis; and (d) a shaft member rigidly mounted on said leg portion lying on said first axis for movement with said slide member, said shaft member including an abutting face centered on said first axis is non-fixed contact with said piston abutment face;

movement of said piston to said extended position moving said shaft member and said slide member to carry said movable tool element toward said stationary tool element said leg being subject to angular movement in response to pressure applied to said movable tool element along said second axis, said angular movement of said leg causing angular deflection of said shaft relative to said axis and said non-fixed contact avoiding angular deflection of said piston.

2. A hydraulic tool according to claim 1, wherein at least one of said abutment face or said abutting face is convex.

3. The hydraulic tool of claim 1, wherein said piston abutment face is convex.

4. The hydraulic tool of claim 1, wherein said piston includes a pocket defined by (i) said abutment face and (ii) a wall tapering outwardly away from said first axis and axially away from said abutment face.

5. The hydraulic tool of claim 4, wherein said abutment face is convex.

6. The hydraulic tool of claim 5, wherein said shaft member is provided with an enlarged head having a wall tapering outwardly and axially away from said abutting face, said shaft member tapering wall being spaced from said piston tapering wall.

7. A hydraulic tool comprising;

(a) a body structure including a hydraulic cylinder extending along a first axis and a stationary tool element offset from said first axis;

(b) a piston received in said cylinder for movement along said first axis from a retracted to an extended position upon introduction of hydraulic fluid into said cylinder, said piston including an abutment face centered on said first axis;

(c) a slide member having a leg extending radially with respect to said first axis, said leg having a portion lying on said first axis and a movable tool element offset from said first axis, said movable tool element cooperating with said stationary tool element to define a second axis offset from and parallel to said first axis;

(d) a shaft member rigidly mounted on said leg portion lying on said first axis for movement with said slide member, said shaft member including an abutting face centered on said first axis in non-fixed contact with said piston abutment face; and (e) a compression spring encircling said shaft having a first end engaging said leg, said spring being supported to be compressed upon movement of said piston from said retracted position to said extended position, said spring acting to move said slide member, shaft and piston to a retracted position upon release of hydraulic fluid from said cylinder; movement of said piston to said extended position moving said shaft member and said slide member to carry said movable tool element toward said stationary tool element.

8. The hydraulic tool of claim 6, wherein said slide member is provided with an axially extending arm offset from said first axis engaged to said body structure for slidable movement relative thereto upon movement of said piston.

9. The hydraulic tool of claim 8, wherein said arm includes a self-lubricating member slidingly engaged to said body structure.

10. The hydraulic tool of claim 7 further including a cylindrical journal engaged to said shaft for movement therewith, a bushing encircling and slideably receiving said journal and means for supporting said bushing in a position centered on said first axis.

11. A hydraulic tool according to claim 1, further including means for resisting angular movement of said movable tool element comprising an arm on said slide member in parallel offset relation to said first axis in sliding engagement with said body structure, a sleeve extending from said shaft for movement therewith and a bushing mounted on said body structure, said sleeve being snugly received in said bushing for sliding engagement therewith.

12. The hydraulic tool of claim 11, wherein said piston abutment face is convex.

13. A hydraulic tool according to claim 12 further including a compression spring encircling said sleeve and resiliently urging said slide member, said shaft and said piston axially away from said stationary tool element.

14. A hydraulic tool comprising:

(a) a hydraulic cylinder having a housing defining a chamber extending along an axis from a first end to a second end and means for introducing hydraulic fluid into said first end;

(b) a stationary tool element offset from said axis mounted in fixed relationship to said housing;

(c) a piston positioned in said chamber for movement along said axis from a retracted position near said first end to an extended position toward said second end in response to the introduction of said hydraulic fluid into said first end, said piston having a first side facing toward said first end and a second side facing away from said first end, said second side including an abutment face;

(d) a shaft extending generally along said axis from a first end abutting said abutment face in non-fixed relationship with said abutment face to a second end;

(e) mounting means for supporting said shaft for movement with said piston away from said hydraulic cylinder first end, said mounting means permitting angular deflection of said shaft relative to said axis without angularly deflecting said piston and including a slide member having a leg extending radially outwardly from said axis, said leg having a portion lying on said axis supporting said shaft in fixed relationship thereto; and (f) a movable tool element on said mounting means aligned with and movable toward said stationary tool element along a path parallel to said axis.

15. The hydraulic tool of claim 14, wherein said piston abutment face is convex.

16. The hydraulic tool of claim 14, wherein said piston second side includes a leading edge at its outer periphery and a pocket defined by (i) a wall tapering from said leading edge inwardly toward said axis and axially toward said first side and (ii) said abutment face, said abutment face being convex.

17. The hydraulic tool of claim 16, wherein said shaft is provided with an enlarged head having a wall tapering outwardly and axially away from said shaft first end, said enlarged head tapering wall being spaced from piston tapering wall.

18. A hydraulic tool comprising:

(a) a hydraulic cylinder having a housing defining a chamber extending along an axis from a first end to a second end and means for introducing hydraulic fluid into said first end;

(b) a stationary tool element offset from said axis mounted in fixed relationship to said housing;

(c) a piston positioned in said chamber for movement along said axis from a retracted position near said first end to an extended position toward said second end in response to the introduction of said hydraulic fluid into said first end, said piston having a first side facing toward said first end and a second side facing away from said first end, said second side including an abutment face;

(d) a shaft extending generally along said axis from a first end abutting said abutment face to a second end;

(e) mounting means for supporting said shaft for movement with said piston away from said hydraulic cylinder first end, said mounting means permitting angular deflection of said shaft relative to said axis and including a slide member having a leg extending radially outwardly from said axis, said leg having a portion lying on said axis supporting said shaft in fixed relationship thereto.

19. The hydraulic tool of claim 18 further including a compression spring encircling said shaft and having a first end engaging said leg, said spring being supported to be compressed upon movement of said piston to said extended position, said spring acting to move said leg, stem and piston to a retracted position upon release of hydraulic fluid from said chamber.

20. The hydraulic tool of claim 19, wherein said slide member is provided with an axially extending arm offset from said axis engaged to said housing for slideable movement relative thereto upon movement of said piston.

21. The hydraulic tool of claim 20, wherein said axially extending segment includes a self-lubricating member.

22. The hydraulic tool of claim 20 further including a cylindrical journal engaged to said shaft second end for movement therewith, a bushing encircling and slideably receiving said journal and means for supporting said bushing in a position centered on said first axis.

23. A hydraulic tool comprising:

(a) a hydraulic cylinder having a housing and a chamber extending along an axis:

(b) a piston received in said chamber for movement along said axis from a retracted to an extended position upon introduction of hydraulic fluid into said cylinder, said piston including an abutment face centered on said axis:

(c) a shaft member mounted for movement with said piston from said retracted to said extended position, said shaft member including an abutting face centered on said axis in non-fixed contact with said piston abutment face; and (d) a slide member supporting said shaft member, said slide member mounted for movement with said shaft member from said retracted to said extended position, a compression spring encircling said shaft having a first end engaging said slide member, said spring being supported to be compressed upon movement of said piston from said retracted position to said extended position, said spring acting to move said slide member, shaft and piston to a retracted position upon release of hydraulic fluid from said cylinder.

24. The hydraulic tool of claim 23, wherein said slide member is provided an arm extending in parallel offset relation to said axis, said arm engaged to said housing for slideable movement relative thereto upon movement of said piston.

25. The hydraulic tool of claim 24, wherein said arm includes a self-lubricating member slidingly engaged to said housing.

26. The hydraulic tool of claim 23, further including a cylindrical journal engaged to said shaft for movement therewith, a bushing encircling and slideably receiving said journal and means for supporting said bushing in a position centered on said axis.

27. A hydraulic tool comprising:

(a) a body structure including a hydraulic cylinder extending along a first axis, said body structure extending from a first end adjacent said cylinder to a second end, said body structure including a stationary tool element offset from said first axis and generally aligned with said second end;

(b) a piston received in said cylinder for movement along said first axis from a retracted to an extended position upon introduction of hydraulic fluid into said cylinder, said piston including an abutment face;

(c) a slide member having a portion lying on said first axis and a movable tool element offset from said first axis, said movable tool element cooperating with said stationary tool element to define a second axis offset from and parallel to said first axis; and (d) a shaft member lying on said first axis and having an end in contact with said piston abutment face and mounted for movement with said slide member;

(e) a journal secured to said shaft member for movement therewith along said first axis;

(f) a bushing engaged to said body structure and slidably receiving said journal; movement of said piston to said extended position moving said shaft member and said slide member to carry said movable tool element toward said stationary tool element and moving said journal in said bushing from said retracted position between said first and second ends to said extended position, said journal lying within said body structure when in said extended position.

28. A hydraulic tool according to claim 27, wherein at least one of said abutment face or said piston end is convex.

29. The hydraulic tool of claim 27, wherein said piston abutment face is convex.

30. The hydraulic tool of claim 29, wherein said piston includes a pocket defined by (i) said abutment face and (ii) a wall tapering outwardly away from said first axis and axially away from said abutment face.

31. The hydraulic tool of claim 27 further including a compression spring encircling said shaft having a first end engaging said slide member, said spring being supported to be compressed upon movement of said piston from said retracted position to said extended position, said spring acting to move said slide member, shaft and piston to a retracted position upon release of hydraulic fluid from said cylinder.

32. The hydraulic tool of claim 27 further including a bushing mounted on said body structure encircling and slideably receiving said journal.

* * * * *